(12) United States Patent
Guan et al.

(10) Patent No.: US 11,213,919 B2
(45) Date of Patent: Jan. 4, 2022

(54) PREPARATION OF ANTIMICROBIAL SURFACE FOR MEDICAL DEVICES

(71) Applicant: BEIHANG UNIVERSITY, Beijing (CN)

(72) Inventors: Yingchun Guan, Beijing (CN); Libin Lu, Beijing (CN); Jiaru Zhang, Beijing (CN); Zhen Zhang, Beijing (CN); Huaming Wang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 16/577,104

(22) Filed: Sep. 20, 2019

(65) Prior Publication Data

US 2020/0009687 A1 Jan. 9, 2020

(30) Foreign Application Priority Data

Sep. 20, 2018 (CN) .......................... 201811097230.9

(51) Int. Cl.
*B23K 26/352* (2014.01)
*A01N 59/06* (2006.01)
*A01N 59/16* (2006.01)
*A01N 59/20* (2006.01)

(52) U.S. Cl.
CPC ............ *B23K 26/352* (2015.10); *A01N 59/06* (2013.01); *A01N 59/16* (2013.01); *A01N 59/20* (2013.01)

(58) Field of Classification Search
CPC .............................. B23K 26/352; A01N 59/06
See application file for complete search history.

(56) References Cited

PUBLICATIONS

Muller et al., Bio-Inspired Functional Surfaces Based on Laser-Induced Periodic Surface Structures, Jun. 2016, Materials, No. 9, vol. 476, pp. 1-29 (Year: 2016).*

* cited by examiner

*Primary Examiner* — Dah-Wei D. Yuan
*Assistant Examiner* — Andrew J Bowman

(57) ABSTRACT

A method of preparing antimicrobial surface on medical devices: first, producing multi-functional surface with bacterial anti-adhesion and self-cleaning functions through single-stop ultrafast laser fabrication approach for development of micro/nano patterns, then producing bactericidal thin film through depositing metal nanoparticles on those micro/nano patterned surfaces. The combination of bacterial anti-adhesion and bactericidal film can inhibit initial bacterial adhesion and release heavy metal ions to kill the bacteria simultaneously. Meanwhile, the multi-functional surface with self-cleaning function can prevent the killed bacteria from accumulating at the substrate surface, thereby obtaining long-lasting antibacterial effect.

5 Claims, 2 Drawing Sheets

PREPARATION OF ANTIMICROBIAL SURFACE FOR MEDICAL DEVICES

CROSS REFERENCE OF RELATED APPLICATION

The present invention claims priority under 35 U.S.C. 119(a-d) to CN 201811097230.9, filed Sep. 20, 2018.

BACKGROUND OF THE PRESENT INVENTION

Field of Invention

The present invention relates to medical devices and modification of material surfaces to provide antimicrobial surfaces.

Description of Related Arts

Infection of implantable medical devices is a major concern in healthcare, which can directly lead to tissue necrosis around the implant, causing disability or even death. Once bacteria attachment to the implant has taken place, the bacteria will form a biofilm between the material and the tissue. This biofilm can provide a platform for the proliferation of bacteria, resulting in the resistance to antibiotic therapy. One of the effective method to reduce these risks is to provide in-situ antibacterial surface for medical devices. The in-situ antibacterial function can be acquired by improving the anti-adhesion property or bactericidal activity of the material surface. Although it is an effective way to reduce bacterial adhesion and biofilm formation on material surface by creating a bacterial anti-adhesion environment, this bacterial anti-adhesion strategy is difficult to achieve 100% inhibition of bacterial adhesion. Adherence of even few bacteria on the surface, it is difficult to inhibit the bacterial proliferation by the antibacterial system. The antibiotic-based bactericidal surface can inactivate the cell body of bacterial on material surface, resulting in sterilization and bacteriostasis. However, use of antibiotic-based fungicides may lead to the development of antibiotic resistant microorganisms. Furthermore, the dead bacteria will accrete on the bactericidal surface, which will not only reduce the bactericidal activity, but also stimulate the immune response. There exists a need for safe and effective antibacterial surface applied to medical devices.

The combination of bacterial anti-adhesion and bactericidal can overcome their respective defects. The methods of fabricating the combined surface can be divided into: graft copolymerization of anti-adhesive and bactericidal monomer, blending of anti-adhesive brush and bactericidal brush, synergy of anti-adhesive brush and release type of bactericide, etc. These surface modification methods are complicated and the bacteriostasis works only if the surface under specific conditions. Therefore, it is very necessary to develop a new simple antimicrobial surface.

To solve the above problems, the present invention proposes a method for fabricating antimicrobial surface on medical devices. A single-stop ultrafast laser is used to produce large area of micro/nano patterns with bacterial anti-adhesion and self-cleaning functions, which can inhibit the initial adhesion of the bacteria. Subsequently, metal nanoparticles such as silver and copper are deposited on the micro/nano patterns by surface coating to prepare bactericidal film. The present invention effectively combines the function of bacterial anti-adhesion and bactericidal and the fabrication method is simple and universality, which can realize long-term antibacterial function on medical device surface.

SUMMARY OF THE PRESENT INVENTION

The present invention is directed to provide a method for preparing antimicrobial surface on medical devices. The micro/nano patterns are produced by a single-stop ultrafast laser to prepare multi-functional surface with bacterial anti-adhesion, hydrophobicity and self-cleaning. Then, metal nanoparticles such as silver and copper are deposited on those micro/nano patterned surface by surface coating to prepare bactericidal thin film. Finally, the antibacterial surface which combines the function of bacterial anti-adhesion and bactericidal is obtained.

Accordingly, the present invention provides a method for preparing antimicrobial surface on medical devices by comprising the following steps:

1) Polishing and degreasing the material surface;
2) Producing micro/nano patterns with single-stop ultrafast laser on the material surface treated in the step 1), so as to obtain multi-functional surface with antibacterial and anti-adhesion and self-cleaning function; and
3) Depositing metal nanoparticles on the micro/nano patterned surface by surface coating, so as to form bactericidal thin film.

Preferably, the material in the step 1) is commercially used in medical devices, comprising of medical metallic materials such as titanium alloy, bismuth-based alloy, cobalt-based alloy, chromium-based alloy, molybdenum-based alloy, stainless steel; and magnesium alloy; polymer materials of polyurethane, silica gel, polyetheretherketone and polylactic acid; and nonmetallic materials of single crystal silicon and glass.

Preferably, the single-stop ultrafast laser used in the step 2) for producing the micro/nano patterns on the material surface with specific parameters of: laser wavelength of 193-1070 nm, laser power of 0.5-1000 W, pulse frequency of 1 k-5M Hz, pulse width of 50 fs-100 ns, and scanning speed of 10-3000 mm/s.

Preferably, in the step 2), the micro/nano pattrens comprises: laser-induced periodic surface (LIPSS), micro-cone, micro-trench; irregular, and combined pattern of the above patterns, wherein the period of LIPSS is 10 nm-1 μm; the height and interval of micro-cone are 50 nm-100 μm and 50 nm-1 μm, respectively; the width and depth of micro-trench are 1-100 μm and 5-100 μm, respectively; and the roughness of irregular pattern is 1-100 nm.

Preferably, the surface coating process in the step comprises: magnetron sputtering, vacuum evaporation plating, ion plating, electroplating, and electroless plating.

Preferably, the metal nanoparticles in the step 3) are metals that can release antibacterial ions, comprising: gold, copper, zinc, silver, and magnesium.

Preferably, in the step 3), the thickness of the bactericidal thin film is 10 nm-500 nm.

Preferably, in the step 3), the contact angle of the bactericidal hin film is more than 90°.

The present invention provides the method for preparing antimicrobial surface on medical devices. The single-stop ultrafast laser is used to fabricate the micro/nano patterns on material surface to prepare multi-functional surface for inhibiting the initial adhesion of the bacteria. Once the bacteria adhere on the surface, the metal nanoparticles such as silver and copper will release heavy metal ions to kill the adherent bacteria and prevent subsequent infection. At the same time, the micro-'nano patterned surface has self-cleaning function that can remove the killed bacteria from the surface into the environment, thereby obtaining a long-lasting antibacterial.

Advantages of the present invention are:

1) The method utilizes single-stop ultrafast laser processing and can process various materials of medical devices by changing the laser parameters.

2) The thermal damage and heat-affected zone are small, wherein various micro/nano patterns can be accurately produced on the medical device surface without change the original mechanical properties of the materials.

3) The coating thickness of metal nanoparticles can be accurately controlled under 10 nm, wherein the toxic effect of metal ion can be reduced without weakening the sterilization performance.

4) This antibacterial surface prepared by the present invention has high antibacterial activity, which can be used on medical device with long-lasting antibacterial.

5) The method is simple, flexible and fast, which is expected to improve the efficiency in industrial production.

DETAILED DESCRIPTION OF THE PREFERRED EMBODIMENT

Figure 1:
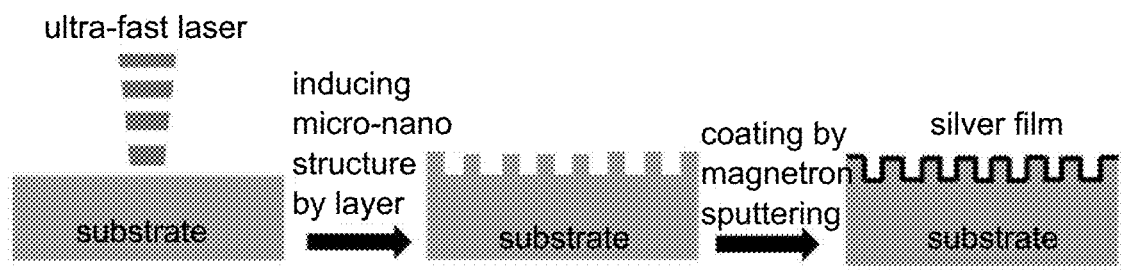
FIG. 1 shows the schematical illustration of a method for preparing antimicrobial surface.
Figure 2:
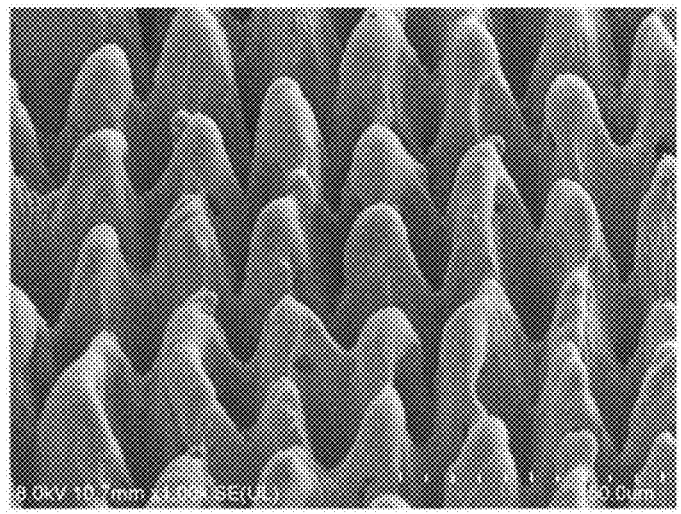
FIG. 2 shows the micro/nano pattern produced by an ultrafast laser in embodiment 1.
Figure 3:
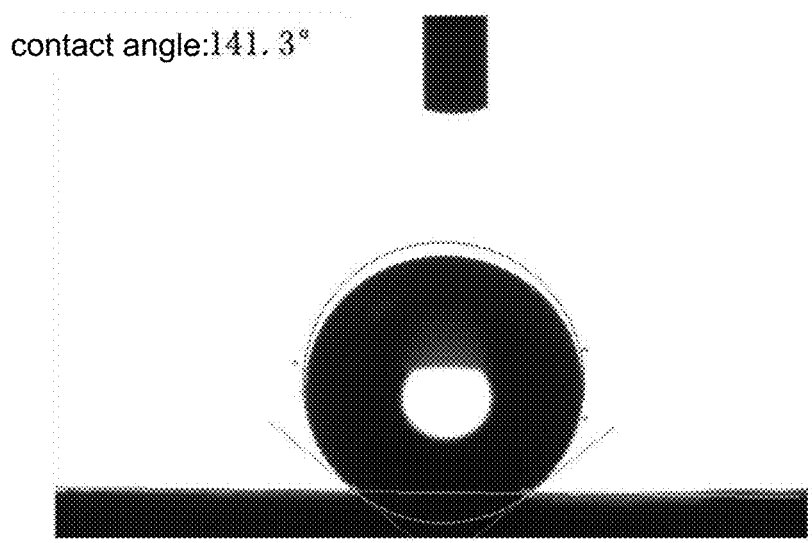
FIG. 3 shows the contact angle of the micro/nano patterned surface after silver coating in embodiment 1.
Figure 4:
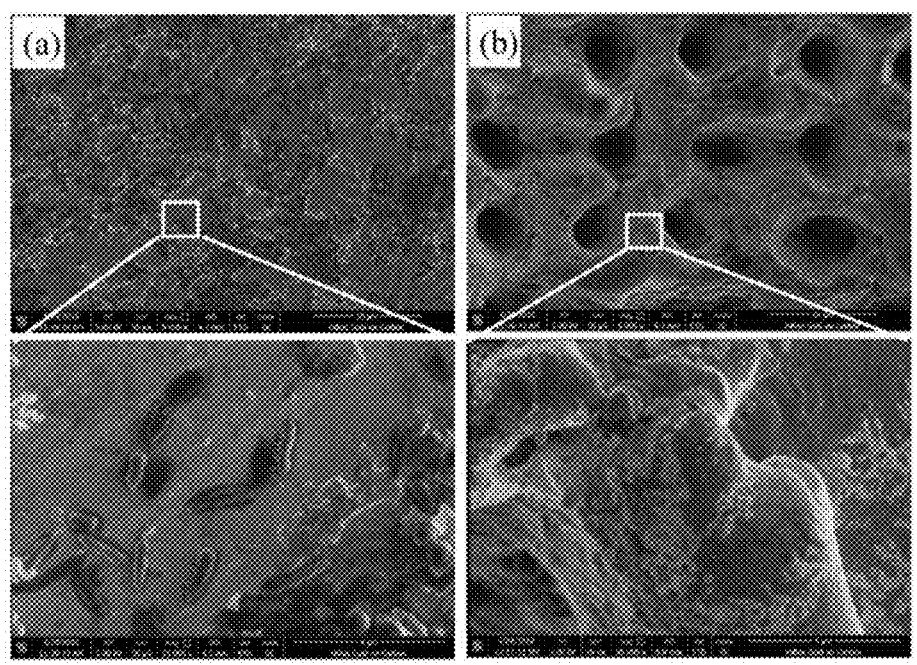
FIG. 4 shows the untreated sample surface and the bacteriostatic surface prepared in embodiment 1 after 24-hour-culture of *Escherichia coli*.

Referring the embodiments, the present invention will be further illustrated.

Embodiment 1

Step 1: Grinding and polishing a Ti6Al4V sample to 1000 mesh, ultrasonically cleaning with alcohol for 5 minutes, and drying;

Step 2: Placing the surface treated Ti6Al4V sample under a femtosecond laser processing system (wavelength 1064 nm) to produce micro/nano pattern on Ti6Al4V sample, wherein laser processing parameters are: power of 8 W, pulse width of 500 fs, a frequency of 400 kHz, scanning speed of 800 mm/s, scanning pitch of 70 μm; scanning times of 5 to obtain micro-cone on the surface of the Ti6Al4V sample; and Step 3: Coating the micro-cone with silver nanoparticles by magnetron sputtering with coating thickness of 2 nm, thereby obtaining antimicrobial surface.

Embodiment 2

Step 1: Grinding and polishing a stainless steel sample to 1000 mesh, ultrasonically cleaning with alcohol for 5 minutes, and drying;

Step 2: Placing the surface treated stainless steel sample under a femtosecond laser processing system (wavelength 1064 nm) to produce micro/nano pattern on stainless steel sample, wherein laser processing parameters are: power of 10 W, pulse width of 500 fs, frequency of 200 kHz, scanning speed of 500 mm/s, scanning pitch of 40 μm; scanning times of 10 to obtain LIPSS on the surface of the stainless steel sample; and Step 3: Coating the LIPSS with copper nanoparticles by vacuum evaporation plating with coating thickness of 6 nm, thereby obtaining antimicrobial surface.

Embodiment 3

Step 1: Grinding and polishing a cobalt-based alloy sample to 1000 mesh, ultrasonically cleaning with alcohol for 5 minutes, and drying;

Step 2: Placing the surface treated cobalt-based alloy sample under a femtosecond laser processing system (wavelength 1064 nm) to produce micro/nano pattern on the cobalt-based alloy sample, wherein laser processing parameters are: power of 4 W, pulse width of 500 fs, frequency of 600 kHz, scanning speed of 600 mm/s, scanning pitch of 50 μm; scanning times of 10 to obtain a micro-cone on the surface of the cobalt-based alloy sample; and Step 3: Coating the micro-cone with gold nanoparticles by ion plating with coating thickness of 8 nm, thereby obtaining antimicrobial surface.

Embodiment 4

Step 1: Grinding and polishing a single crystal silicon sample to 1000 mesh, ultrasonically cleaning with alcohol for 5 minutes, and drying;

Step 2: Placing the surface treated single crystal silicon sample under a femtosecond laser processing system (wavelength 1064 nm) to produce micro/nano pattern on single crystal silicon sample, wherein laser processing parameters are: power of 7 W, pulse width of 500 fs, frequency of 1000 kHz, scanning speed of 500 mm/s, scanning pitch of 30 μm; scanning times of 6 to obtain micro-cone on the surface of the single crystal silicon sample; and Step 3: Coating the micro-cone with silver nanoparticles by electroplating with coating thickness of 10 nm, thereby obtaining antimicrobial antibacterial surface.

What is claimed is:

1. A method for preparing antimicrobial surface on medical devices, comprising steps of:
   1) grinding and polishing a material surface at 1000 mesh, ultrasonically cleaning with alcohol for 5 minutes, and drying;
   wherein a material of the step 1) is commercially used in medical devices, comprising medical metallic materials of titanium alloy, bismuth-based alloy, cobalt-based alloy, chromium-based alloy, molybdenum-based alloy, stainless steel, and magnesium alloy; polymer materials of polyurethane, silica gel, polyetheretherketone and polylactic acid; and nonmetallic materials of single crystal silicon and glass;
   2) producing micro/nano patterns with single-stop ultrafast laser on the material surface treated in the step 1), wherein a laser wavelength is 1064 nm, a laser power is 4-10 w, a pulse frequency is 200-1000 kHz, a pulse width is 500 fs, and a scanning speed is 500-800 mm/s, so as to obtain a micro-cone structure with a pitch of 10 μm; the micro-cone structure has a multi-functional surface with antibacterial and anti-adhesion and self-cleaning functions; and
   3) depositing metal nanoparticles on the multi-functional surface by magnetron sputtering, vacuum evaporation plating, ion plating, electroplating, or electroless plating, so as to form a bactericidal film, wherein a contact angle of the bactericidal film is more than 90°.

2. The method, as recited in claim 1, wherein a material of the step 1) is commercially used in medical devices, comprising medical metallic materials of titanium alloy, bismuth-based alloy, cobalt-based alloy, chromium-based alloy, molybdenum-based alloy, stainless steel, and magnesium alloy; polymer materials of polyurethane, silica gel, polyetheretherketone and polylactic acid; and nonmetallic materials of single crystal silicon and glass.

3. The method, as recited in claim 1, wherein the single-stop ultrafast laser in the step 2) for producing the micro/nano patterns on the material surface has specific parameters of: a laser wavelength of 193-1070 nm, a laser power of 0.5-1000 W, a pulse frequency of 1 k-5 MHz, a pulse width of 50 fs-100 ns, and a scanning speed of 10-3000 mm/s.

4. The method, as recited in claim 1, wherein the metal nanoparticles in the step 3) are metals which release antibacterial ions, comprising:

gold, copper, zinc, silver, and magnesium.

5. The method, as recited in claim 1, wherein in the step 3), a thickness of the bactericidal film is 10 nm-500 nm.

* * * * *